Jan. 29, 1963
M. E. WEBSTER
3,075,739
VALVE FOR BLOW TORCH
Filed Nov. 5, 1956
2 Sheets-Sheet 2
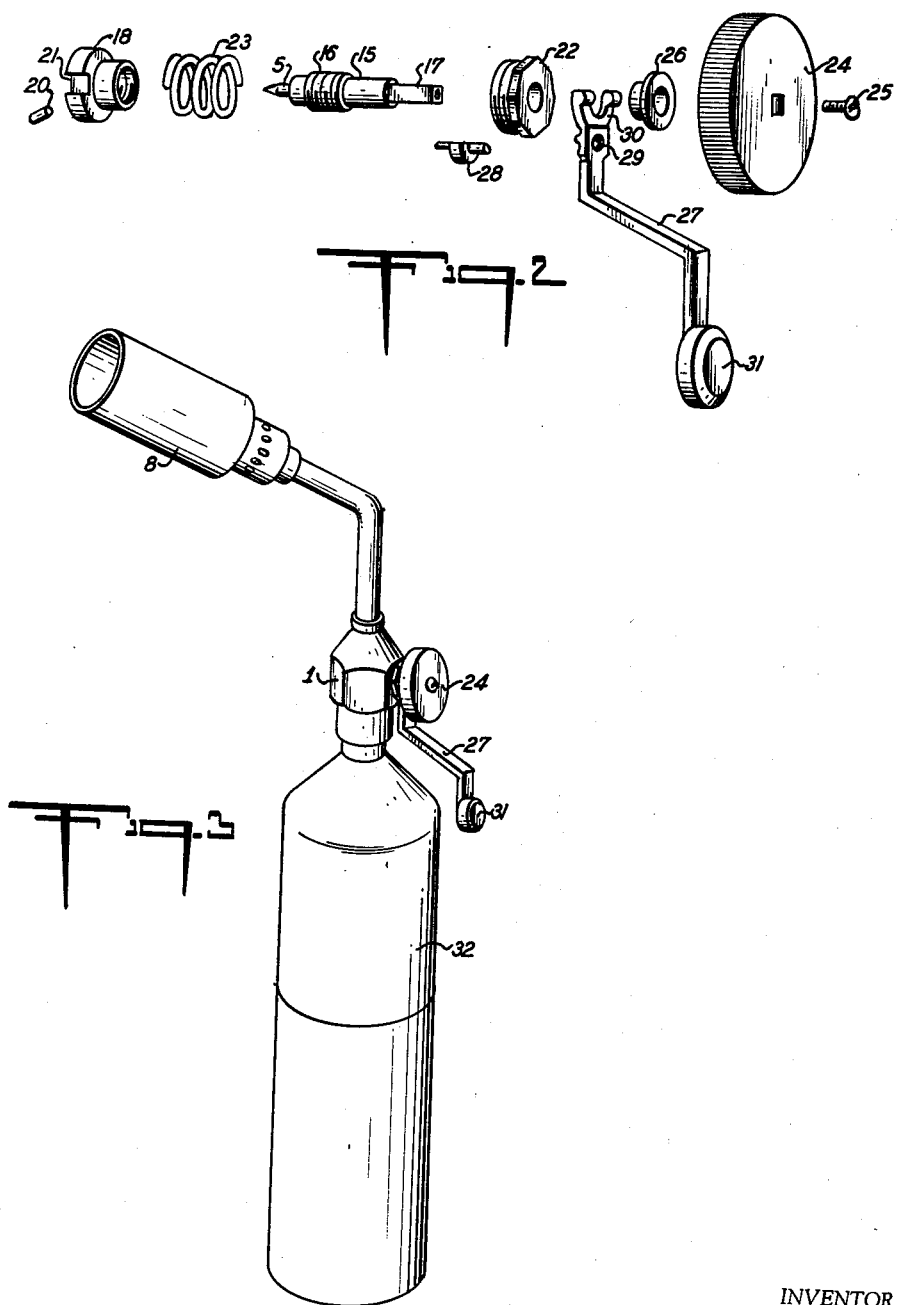
INVENTOR
MILO E. WEBSTER
BY *Burgess, Dinklage & Sprung*
ATTORNEYs

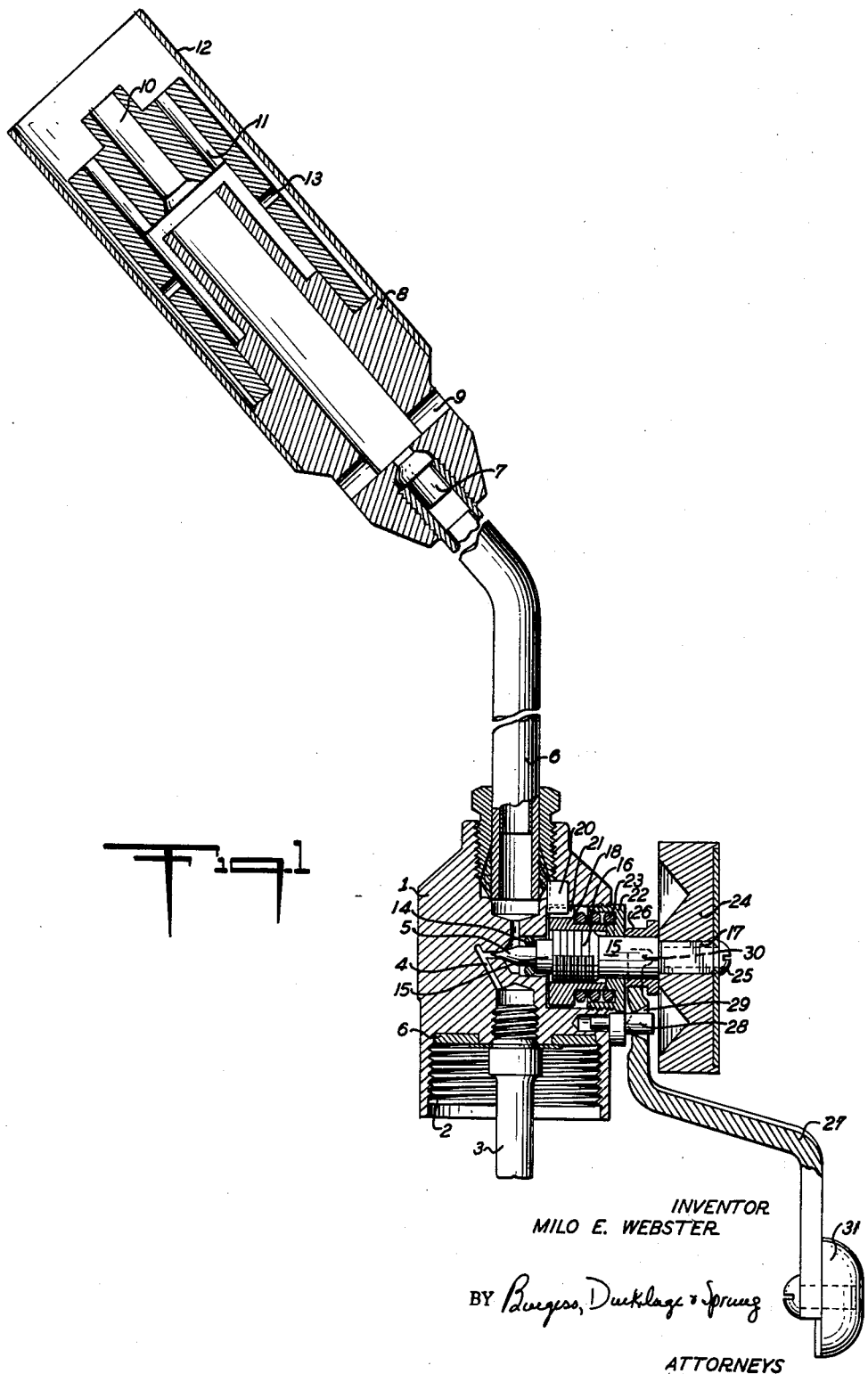

United States Patent Office 3,075,739
Patented Jan. 29, 1963

3,075,739
VALVE FOR BLOW TORCH
Milo E. Webster, Rochester, N.Y., assignor to Otto Bernz Co., Inc., Rochester, N.Y., a corporation of New York
Filed Nov. 5, 1956, Ser. No. 620,456
2 Claims. (Cl. 251—221)

This invention relates to a new and improved torch. This invention more particularly relates to a torch having a push-button flame-control mechanism and which is suitable for use with a portable LP gas cylinder.

In recent years torches operating off small, disposable LP gas cylinders containing liquefied propane, have widely replaced the conventional gasoline-type blow torches for soldering, heating, burning, and other purposes in connection with which torches are used. These torches, operating off the small, inexpensive, portable, throw-away LP cylinders, such as the Bernz-O-Matic cylinders, have the advantage that the same are very convenient to use, light instantaneously, require no pumping or priming, and give a much hotter flame than the gasoline torches or torches which burn similar, normally liquid hydrocarbon or alcohol fuel.

The disposable LP cylinders generally have a discharge bung provided with a male threaded portion and a central discharge opening, which is normally closed by a check valve, such as an ordinary automobile tire valve. The torches have a tap connection which is screwed over the male threaded portion of the discharge bung into the cylinder. The tap connection has a stem which extends from the discharge hole from the cylinder, and, when the tap connection is screwed in place, presses on the check valve, opening the same and allowing communication between the interior of the cylinder to the torch. The shut-off and control of gas flow through the torch is generally effected by means of a needle-type regulating valve, which is controlled by a hand screw.

In operation, the operator normally lights the torch by opening the hand screw and adjusts the flame to the desired operating character and size. During the normal operation, the flame is maintained at this size, even during the periods when the torch is not used, as it is generally inconvenient to turn the flame down and readjust the same or to extinguish the flame and relight the same before the particular job is completed. This generally is not a disadvantage in connection with the smaller type torches, since a normal cylinder of fuel will provide many hours burning even with the flame maintained at its normal operational size.

For many purposes, however, as, for example, in the sweat-fitting of larger diameter tubing such as is used in air-conditioning and refrigerating systems, for paint burning, and for various other purposes, a much larger flame, and thus a much larger torch head, is desirable.

In the conventional torches operating off portable, disposable LP cylinders, a torch head having a maximum diameter of about one-half to three-quarters of an inch is generally provided. In connection with torches having a larger torch-head diameter, as, for example, an excess of about an inch, which are desirable for the latter-mentioned purposes, operation becomes uneconomical, since the small, disposable LP cylinder becomes quickly exhausted.

One object of this invention is to overcome the above-mentioned disadvantage by providing the torch with a flame-adjustment mechanism, which allows the pre-setting of a desired pilot flame and the instantaneous adjustment to the desired operating flame size by push-button control.

A further object of this invention is an LP hand torch having a conventional hand-screw-type flame adjustment operable in conjunction with a push-button-type flame adjustment, and in which the hand-screw-flame adjustment may be used to shut off the gas supply flowing through the torch and to lock the push-button-type flame control in an inoperable position, thus preventing accidental gas discharge. These and still further objects will become apparent from the following description read in conjunction with the drawing, in which:

FIG. 1 is a vertical section of an embodiment of a torch in accordance with the invention;

FIG. 2 is an exploded perspective view of the push-button and hand-screw, flame-adjustment mechanism of the torch of FIG. 1; and FIG. 3 is a perspective view of the torch of FIG. 1 shown in position on a disposable LP gas cylinder.

Referring to the embodiment as shown in the drawing, the torch has a tap connection 1 in connection to a portable, disposable LP gas cylinder, as, for example, the cylinders widely sold under the trade name "Bernz-O-Matic" cylinders. This tap connection has a cylindrical recess with the female threads 2, which are screwed over a corresponding male-threaded connection provided on the LP cylinder. The tap connection also has a stem member 3 which extends into the discharge opening of the cylinder, pressing on the closure valves, such as ordinary automobile tire valves, opening the same. The cylinder generally has a rubber O ring in its discharge outlet, through which stem 3 extends in gas-tight contact. Additionally, as the tap connection is screwed tight, the resilient washer 6 insures further gas-tight connection. The stem 3 has a longitudinally extending bore, through which gas may flow from the cylinder into the gas passage 4. A pressure-reducing member, as, for example, a restrictor rod, flow orifice, filter, or the like, or, preferably a flow-reducing regulating member of the type described in my co-pending application, Serial No. 438,400, filed June 22, 1954, now Patent 2,793,504, May 28, 1957, may be positioned in the bore of this stem 3 to prevent unvaporized liquid particles or droplets from passing therethrough and interfering with the operation of the torch and for reducing the gas pressure.

From the gas passage 4 gas passes through the shut-off and regulating needle valve 5 into the stem 6 through a spud 7 containing a small gas-flow orifice and preferably some filter material into the torch head 8 of conventional construction.

The torch at 8 has the radial air-inlet openings 9, through which air is sucked, forming a combustible mixture with the fuel gas which passes through the central axial nozzle 10 and the annular ring of smaller nozzles 11 and the radially positioned outlets 13, forming a torch flame directed through the cylindrical sleeve 12 on ignition.

The needle valve 5, which may be used to shut off or regulate the gas flow from the passage 4 to the stem 6, extends through the rubber O ring 14, which serves to prevent gas leakage therepast. This needle valve has a stem 15, a threaded portion 16, and a square shaft 17 with a tapped hole. The threaded portion 16 of the needle valve is screwed into a bushing 18 having an internal female thread. The bushing 18 may move a limited amount axially within the housing of the tap connection 1, but rotation thereof is prevented by means of a pin 20, which extends through the housing into a groove 21 in the bushing. The bushing 18 is maintained in place by means of a coil spring 23 and a nut 22, which is screwed in the housing of the tap connection 1.

A bushing 26 is freely rotatably mounted on the shaft portion 15 of the needle valve 5 between the nut 22 and hand knob 24.

A double-bent lever arm 27 is positioned with its counter-sunk hole 29 fitting over the pin 28. The lever arm has an upper forked end 30 which engages the bushing 26 and a lower push button 31. While the lever arm 27 is positioned on the pin 28, due to the counter-sinking of the hole 29, it pivots with this pin being roughly its fulcrum point. The lever arm will not become disengaged, since the hand knob 24 prevents the same from being completely slipped off the pin 28.

In operation, the tap connection 1 is screwed over a portable LP gas cylinder 32 (FIG. 3), which is preferably of the throw-away type. The tap connection forms a gas-tight seal with the interior of the cylinder and the stem 3 opens the check valve, such as the tire valve, and establishes gas-flow communication with the interior of the cylinder. The needle valve 5 is opened by screwing the hand knob 24 counter-clockwise and the combustible mixture emerging from the torch tip 8 is ignited. The hand knob 24 is then turned clock-wise, moving the needle valve 5 toward its closed position until a small pilot flame is adjusted at the torch head 8.

When the operator desires to use the torch, as, for example, for sweat-fitting or burning, he presses the finger button 31, which causes the lever arm 27 to pivot about the fulcrum point at 28. This causes the forked end 30 to press against the bushing 26, which, in turn, presses against the hand knob 24, forcing the entire needle valve in an axial direction outward from the tap connection housing. This causes a movement of the bushing 18 and compression of the spring 23, allowing an opening of the needle valve 5 any desired amount to its maximum position, depending upon the degree that the button 31 is pressed. The operator may therefore, by merely pressing the button 31, control the exact flame size.

Upon release of the button 31, the spring 23 forces the bushing 18 and the needle valve 5 back to its original pre-set position, reducing the flame to its pre-set pilot size.

If the operator desires to maintain a larger flame without the use of the button 31, he merely sets the hand knob 24 in the conventional manner, which will vary the degree of opening the needle valve 5.

In order to extinguish the flame, the hand knob 24 is merely turned clock-wise, shutting the needle valve 5. After the needle valve 5 reaches its closed position, further turning of the hand knob 24 in the clock-wise direction will move the bushing 18 in a direction compressing the spring 23 until the spring 23 is so compressed that the bushing 18 comes to a positive stop. At this position the button 33 can no longer be depressed, so that the torch may be maintained in a shut-off position without danger of accidental discharge of gas by accidental pressing or bumping of the button 31.

While, as mentioned, the control arrangement is particularly well suited in connection with larger torches, since the same allows particularly high gas economy in operation, the same is also suitable for the smaller sized torches and produces a corresponding fuel saving in the operation thereof and additionally increases the operational flexibility.

While the flame-control mechanism in accordance with the invention is primarily intended for use in connection with torches operating off portable throw-away LP cylinders, the same is, of course, suitable for use in connection with other torches, as, for example, torches having a permanent fuel supply container as a part thereof, or torches connected to larger fuel containers, as, for example, through flexible conduits.

While the invention has been described in detail with reference to the specific embodiment shown, various changes and modifications which fall within the spirit of the invention and scope of the appended claims will become apparent to the skilled artisan.

I claim:

1. In a trigger-operable control valve, a valve body having a fluid passage therein and a valve seat in the passage, a bushing mounted in said valve body for limited axial movement toward and away from the valve seat, stop means limiting the movement of said bushing in the direction away from said valve seat, a valve member screw threaded in said bushing for movement upon screwing toward and away from the valve seat, said valve member being dimensioned for screwing to its closed position against said valve seat when said bushing is against said stop means, a sleeve positioned in the valve body and having an annular spring seat surrounding the valve member, a spring bearing against the spring seat and urging the bushing in a direction to close the valve, means for securing said bushing against rotation, and a pivotally mounted trigger lever connected to said valve member to move the same in a valve opening direction with the bushing in opposition to said spring upon pivotable movement of the lever.

2. In a trigger-operable control valve a valve body having a fluid passage therein and a valve seat in the passage, a bushing mounted in said valve body for limited axial movement toward and away from the valve seat, stop means limiting the movement of said bushing in the direction away from said valve seat, a valve member screw threaded in said bushing for movement upon screwing toward and away from the valve seat, said valve member being dimensioned for screwing to its closed position against said valve seat when said bushing is against said stop means, a sleeve positioned in the valve body and having an annular spring seat surrounding the valve member, a spring bearing against the spring seat and urging the bushing in a direction to close the valve, means for securing said bushing against rotation, a lock pin generally parallel to the valve member extending into the valve body and contacting the sleeve so as to hold it in position, an abutment on the valve member outwardly of the valve body, and a trigger lever having a mid portion loosely surrounding said lock pin and engageable with an edge of said sleeve to pivot thereabout, one end positioned manually accessible for pivoting the lever and an opposite end portion loose on said valve member and engageable with the abutment on the valve member to move the valve member with the bushing in a valve opening direction in opposition to said spring on pivotable movement of the lever.

References Cited in the file of this patent

UNITED STATES PATENTS

| 903,114 | Snell | Nov. 3, 1908 |
| 973,074 | Scaife | Oct. 18, 1910 |
| 1,280,068 | Moorhouse | Sept. 24, 1918 |
| 1,740,602 | Keeler | Dec. 24, 1929 |
| 2,038,508 | Elliott | Apr. 21, 1936 |
| 2,388,327 | Jacobsson et al. | Nov. 6, 1945 |
| 2,683,484 | Falligant | July 13, 1954 |

FOREIGN PATENTS

| 361,204 | France | of 1906 |
| 820,516 | Germany | of 1951 |